United States Patent

Arai et al.

[11] Patent Number: 5,119,479
[45] Date of Patent: Jun. 2, 1992

[54] USER INTERFACE SYSTEM IN WHICH OPERATION ASSOCIATED WITH INPUT DEVICE MAY BE SELECTIVELY SWITCHED

[75] Inventors: Toshifumi Arai; Masayuki Tani; Koichiro Tanikoshi; Shinya Tanifuji, all of Hitachi, Japan

[73] Assignee: Hitachi, Ltd., Tokyo, Japan

[21] Appl. No.: 404,948

[22] Filed: Sep. 6, 1989

[30] Foreign Application Priority Data

Sep. 20, 1988 [JP] Japan .................. 63-233423

[51] Int. Cl.⁵ .................. G06F 3/033; G06F 3/153
[52] U.S. Cl. .................. 395/275; 395/775; 395/919; 340/706; 340/710; 364/DIG. 1; 364/237.3; 364/236.8
[58] Field of Search ... 364/200 MS File, 900 MS File, 364/419, 488, 521, 514; 340/706, 709, 710, 723, 724; 395/919, 934

[56] References Cited

U.S. PATENT DOCUMENTS

| | | | |
|---|---|---|---|
| 4,527,236 | 7/1985 | Ermolovich | 364/200 |
| 4,603,384 | 7/1986 | Branningham et al. | 364/200 |
| 4,603,385 | 7/1986 | Mueller et al. | 364/200 |
| 4,689,761 | 8/1987 | Yurchenco | 364/708 |
| 4,783,730 | 11/1988 | Fischer | 364/200 |
| 4,813,013 | 3/1989 | Dunn | 364/900 |
| 4,847,803 | 7/1989 | Miyano | 364/900 |
| 4,905,181 | 2/1990 | Gregory | 364/900 |
| 4,931,935 | 6/1990 | Ohira et al. | 364/419 |
| 4,982,323 | 1/1991 | Nakamura | 364/200 |
| 4,984,152 | 1/1991 | Muller | 364/200 |
| 5,034,916 | 7/1991 | Ordish | 364/900 |

Primary Examiner—Michael R. Fleming
Assistant Examiner—Gopal C. Ray
Attorney, Agent, or Firm—Antonelli, Terry, Stout & Kraus

[57] ABSTRACT

A user interface system receives data from input devices and, on input of data, that data is associated with one of a plurality of names, which names are stored in a reference memory. The resulting data signal is processed by suitable a processing device, which determines the operation to be carried out on the data on the basis of selection of one of a plurality of operations stored in a rule base memory, which selection is determined by the name that has been associated with the data. A control output to e.g. a display is then generated by the processing device. One of the operations stored in the rule base memory is that which determines the association of names and data. By configuring the user interface in this way, a more flexible arrangement can be achieved.

8 Claims, 3 Drawing Sheets

MOUSE ( PUSHING DOWN OF BUTTON ) => CALL DATA ACQUISITION
  |              |                      |
  202            203                    201

MOUSE ( PUSHING DOWN OF BUTTON ) => IF MODE=EXECUTION THEN
                                      CALL DATA ACQUISITION
                                    ELSE IF MODE=EDITING THEN
                                      MOVE

FIG. 6(a)

| PHYSICAL INPUT DEVICE | LOGICAL INPUT DEVICE |
|---|---|
| MOUSE | MOUSE FOR EXECUTION |
| KEYBOARD | KEYBOARD FOR CHARACTER INPUT |

FIG. 6(b)

| PHYSICAL INPUT DEVICE | LOGICAL INPUT DEVICE |
|---|---|
| MOUSE | MOUSE FOR EDITING |
| KEYBOARD | KEYBOARD FOR CHARACTER INPUT |

FIG. 7

| NAME OF INPUT DEVICE | NAME OF INPUT OPERATION | CURSOR COORDINATE | CHARACTER CODE |
|---|---|---|---|

FIG. 8

(a) MOUSE FOR EXECUTION (PUSHING DOWN OF BUTTON) => ASSIGN MOUSE FOR EDITING MOUSE (b) MOUSE FOR EDITING (PUSHING DOWN OF BUTTON) => ASSIGN MOUSE FOR EXECUTION MOUSE (c) MOUSE FOR EXECUTION (PUSHING DOWN OF BUTTON) => CALL DATA ACQUISITION
 MOUSE FOR EDITING (PUSHING DOWN OF BUTTON) => MOVE

USER INTERFACE SYSTEM IN WHICH OPERATION ASSOCIATED WITH INPUT DEVICE MAY BE SELECTIVELY SWITCHED

BACKGROUND OF THE INVENTION

Field of the Invention

The present invention relates to a user interface system (hereinafter referred to as a UI system). In general, but not exclusively, a UI system is a programming tool for permitting a program designer to adapt a program or a series of programming operations to a particular end use.

A UI system for measuring devices or data processing programs may be arranged to define the interaction between equipment and the programs which control that equipment in terms of functions which correspond to the operation of a keyboard or other data input devices, such as a mouse. Such input devices permit the user to indicate processes to be executed by the measuring devices or programs.

Those processes include data acquisition and/or data collection by the devices or programs. In one known UI system, as described in The Complete Hypercard Handbook, published by Bantam Books Inc., by D G Gooman (1987), the relationship between operations carried out by users and the processing performed by the program can be defined and changed without completing execution of the program. In addition, in order to increase the independence of the programming from the input/output devices, it is also known to convert the relationship between a physical input device and a logical input device which deals with the data from the physical input device, on the basis that the data is from a virtual logical input device. That conversion depends on the input data type, and an example is described in the document "International Standard ISO 7942, Information Processing System Computer Graphics-Graphical Kernel System (GKS) Function Description (August, 1958)".

In the UI system described above, character strings and graphics are displayed on a screen and the display areas are handled by segments with special meanings. These areas are called icons, buttons or fields (hereinafter referred to simply as icons). A user can move the cursor to the desired icon using an indicating device, such as a mouse, by operating the button or buttons on the mouse. This operation will be referred to as "clicking" the mouse. Such a UI system can respond to users' operations and execute the desired process defined in advance by the icon.

There are various ways of expressing the relationship between the operations carried out by the user and the devices or programs. FIG. 2 of the accompanying drawings shows a typical rule. The portion of the rule on the left side of the symbol (201) shown in FIG. 2 refers to the location from which the operation of the rule is specified and the location for specifying the process. Thus, an input device (i.e. the mouse) is shown at 202 and an input operation (clicking the mouse) is shown at 203. This operation calls for data acquisition which is the function of device or program.

Thus, based on the rule shown in FIG. 2, clicking the mouse (pushing down the mouse button) when associated with the icon invokes the function for data acquisition from the device or program. Such operation of clicking the mouse in relation to a specific icon will hereinafter be referred to as clicking that icon.

In a conventional UI system as described above, each operation by the user corresponds to one process only. Therefore, it becomes difficult to achieve a flexible UI system which can switch between one process and another, and operate those processes on the basis of the same operation by the user. In many cases, it is important to switch processes to be carried out by a specific user operation, in dependence on the programming situation.

An example of the problems involved in modifying a conventional UI construction will be discussed below with reference to a specific example.

Most UI systems are provided to end users as finished products which cannot be modified. However, in order to set up such user interfaces, modification may be required from a standard system, which modifications will depend on the scale and interests of the user, and on the user's demands and applications. FIG. 4 of the accompanying drawings shows an example of a UI system for data collection where the user can signal for data aqcquisition or data collection by clicking the icons 401, 402, respectively. In order to understand the modification of the program, consider the case where the intention is to move the icon corresponding to data acquisition 401 to the position shown in FIG. 5. Such movement will be performed by clicking the icon, and it can immediately be appreciated that clicking the icon must carry out two different functions. Thus, in one case, clicking the icon must cause the program to carry out the data acquisition function where the data collection program is running and in the other case, correponding to the case where the program is to be changed, clicking the icon must permit the icon display location to be shifted.

In conventional methods, only one such operation can be specified so that flexible use of an operation for various situations is impossible. The only known way of overcoming this is to provide a conditional branch in the programming, so that, depending on the specified condition, different processes can be carried out as indicated by FIG. 3 of the accompanying drawings. As shown therein, two modes can be specified, and by interchanging between those modes either data acquisition or editing of the program can be carried out. It is assumed that an if- statement is used to specify the conditional branch, and therefore a value for the mouse variable "mode" has to be set at different locations in the program. The displayed icon location can be moved so long as the mouse button is held down during cursor movement.

However, problems occur in the conventional use of conditional branches, as will be discussed below. In order to create an icon, it is usual to duplicate an existing item that has suitable attributes which can be used for the new icon, such as rules or a display format. This reduces the time for specifying such icons, and means that a new icon can share at least some attributes with the original icon. In order to achieve this, icons may be defined in terms of standard program "objects" which can be stored in a suitable library of such objects. In order to specify an icon, a standard object is retrieved from the library and modified in the desired way. That modified icon may then also be stored in the library. If a new icon is to be created, a stored object is extracted from the memory (which object may be one of the original ones or a modified one which has previously been created), and that object may then be further modified in order to achieve the desired characteristics of the new icon. With such a newly created icon, the attributes necessary for UI editing may be used unchanged, and other attributes for program execution must be modified. Thus, as discussed above, some of the attributes are obtained from a previously defined icon, which attributes are common to general icon processes, and other attributes which are specific to individual icons have to be defined separately so as to permit that attribute to be used when the icon is clicked.

This means that, in many cases, the processes carried out by an icon for program execution and for editing are defined by different users in different situations. Therefore, when these definitions exist in one standard rule or object, as in the conventional method, it becomes complicated to define or modify the attributes, and therefore it is more likely that mistakes will be made. In particular, if an object defining an icon contains a conditional operation, as discussed above, then each object containing that conditional step will have to be changed if it is necessary to modify the conditional operation. This will be true even if the change necessary is the same for each icon (and hence the same for each object, since, in each case, only a part of the conditional statement will usually be modified.

There is the further complication that, when a conditional branch is used in a conventional method, the size of the rule or object increases, and therefore complicated conditional branches must be produced. This makes for a large UI system which is very difficult to define and modify. Thus, these problems mean that a UI system in which the same operation can correctly be programmed to correspond to current situations cannot be fully achieved by conventional methods. In the above example, clicking the mouse can result in the execution of different program functions, but it is difficult to program the UI system to achieve this, and the need for conditional statements in each of the rules (objects) means that those rules have to be modified independently, and there is the strong liklihood of a mistake being made.

SUMMARY OF THE INVENTION

The present invention seeks to overcome, or at least ameliorate, these problems. According to the present invention, it is proposed to provide a function which acts as a logical input device, which is a "name" corresponding to a particular function of a physical input device (e.g. the mouse or keyboard). Furthermore, the correspondence between the logical input device (name) and physical input device can be changed depending on the operations of the user or conditions in the operation of the program.

Thus, when the physical input device inputs data (such as a mouse click) one of a plurality of names is associated with that input, and, when that input is processed, the operation corresponding to the name is determined. The selection of the name is on the basis of one of the operations, so that it is possible for the user, by suitable operation, to change from one name to the other.

In this way, one logical input device (name) can be specified for editing, and another for carrying out the function of a device or program. Thus, the operation of the device changes depending on the users requirements. By defining the processes of the device, and the program for inputting data from individual logical input devices (name), the process for each purpose can be defined by suitable rules independent of each other. Thus, the part of each rule or operation only requires one purpose to be defined, and does not require conditional statements or further complicated description. Therefore, it is easier to modify one or more program objects.

In addition, with the present invention, it is easy to define user operations for various purposes, such as program functions or UI system editing.

Thus, consider a program which has been devised from a plurality of program objects, and some of which are obtained directly from a library of objects, and some of which represent modified objects from that library. Each object may then contain one or more names, and each name is associated with a specific operation. Thus, one name may correspond to a program function, such as data collection, and another name may be for editing. There are no conditional statements in such objects. One further object is then necessary where the operation associated with one name causes the means for assigning the names to switch from assigning one name to assigning another name, and that name in the object will then correspond to a change in association with the first name. In this way, one object permits the association of the name to be changed, and then all other objects will act on that new name. Then, the name can be changed back, and all objects will then act on the new name.

BRIEF DESCRIPTION OF THE DRAWINGS

An embodiment of the invention will now be described in detail, by way of example, with reference to the accompanying drawings in which:

FIGS. 6(a) and 6(b) are tables indicating the relationship between a physical input device and a logical input device (name);

FIG. 7 is a diagram indicating form of data transmitted from a switching function of a logical input device; and FIG. 8 shows a rule which defines processes associated with each icon.

DETAILED DESCRIPTION

Figures 1, 2, 3:
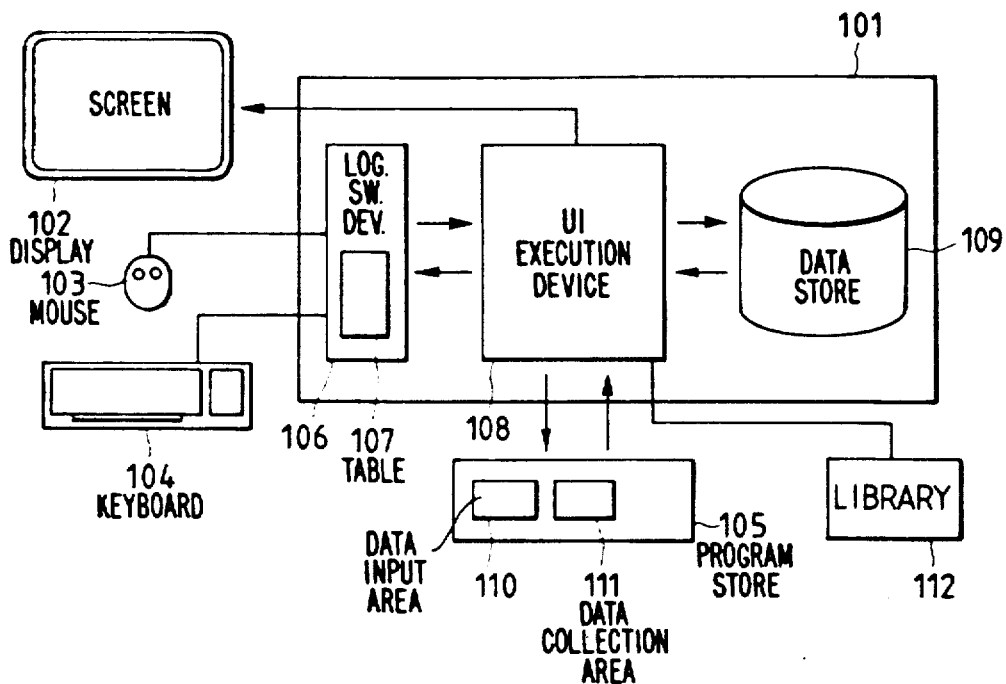
FIG. 1 shows a general schematic view of a user interface system according to the present invention.
FIG. 2 shows a rule for use in a user interface system.
FIG. 3 shows conditional rules used in the prior art.

An example of a user interface system informed an embodiment of the present invention will now be described with reference to FIG. 1, which is a schematic diagram of a data collection system. In that collection system, the interface system of UI construction 101 is connected to an interactive screen 102 to display information to users. The interface system 101 is also connected to a mouse 103 representing a physical input device, and is further connected to a keyboard 104. Also shown is a data collection program store 105, a logical switching device 106 connected to the physical input device (mouse) 103, a table 107 which stores logical input device information corresponding to the physical input device 103, a UI execution device 108 for processing functions based on the input data and stored rules, a UI execution data store 109 which includes data concerning icon location and the rules required for UI execution, and data input execution area 110 and data collection execution area 111 of the data collection program store 105, respectively.

FIG. 1 also shows a library 112 in which standard program objects are stored.

Before discussing an example of the operation of a UI system according to the present invention, the general operation will first be discussed. Suppose data is input from a data input device, such as mouse 103 in FIG. 1. On input of that data to the logical switching device 106, in accordance with the present invention it is necessary to associate a "name" with that data. That "name" can be treated as a logical input device designation, and is obtained from table 107. The determination of the selection of the name will be discussed later.

Once an appropriate name has been associated with the data, the data is passed to the UI execution device 108. The UI execution device 108 identifies the name, and checks in the data store 109 for the operation corresponding to the name. Thus, the data store 109 forms a rule base memory in which are stored a plurality of operations corresponding to the plurality of names that can be associated with a given piece of data by the logical switching device 106. On processing of that operation, a control output can be generated on the basis of the data input and the operation.

One of the operations stored in the data store 109 is the operation which determines the selection of the name when data is input. Thus, by activating that operation, the name associated with subsequent data inputs may be changed.

To understand this more clearly, consider the case where one of two operations is to be carried out when the mouse is clicked, those two operations being altering the format of the display and altering the value of the data which is displayed. Suppose that these two operations, for a given icon, are associated with a given program object which is pre-defined e.g. from the library 112 of objects, then those two operations are associated with first and second names. There is then provided a further program object, again associated with the first and second names, but operating so to convert from association with that one name to association with the other name, i.e., to effect switching between names. Thus, suppose the system is initially set up so that the one name is associated with the data input. In that case, when the object corresponding to the icon is operated, the operation corresponding to that name will be activated, so that e.g. the display may display a different value of the data. Suppose that at some later time the further object which changes the name association is activated, then a subsequent data input will be associated with the other name, and thus, if the object corresponding to the icon is triggered, the other operation associated with the other name will be activated permitting, e.g., the format of the display to be changed. If, subsequently, the operation which associates the name is activated, then association will then return to association with the one name.

Thus, there are no conditional statements in the objects stored in the library 112 of objects, but instead each object contains two (or more) names and two (or more) operations associated with those names.

Figure 4:
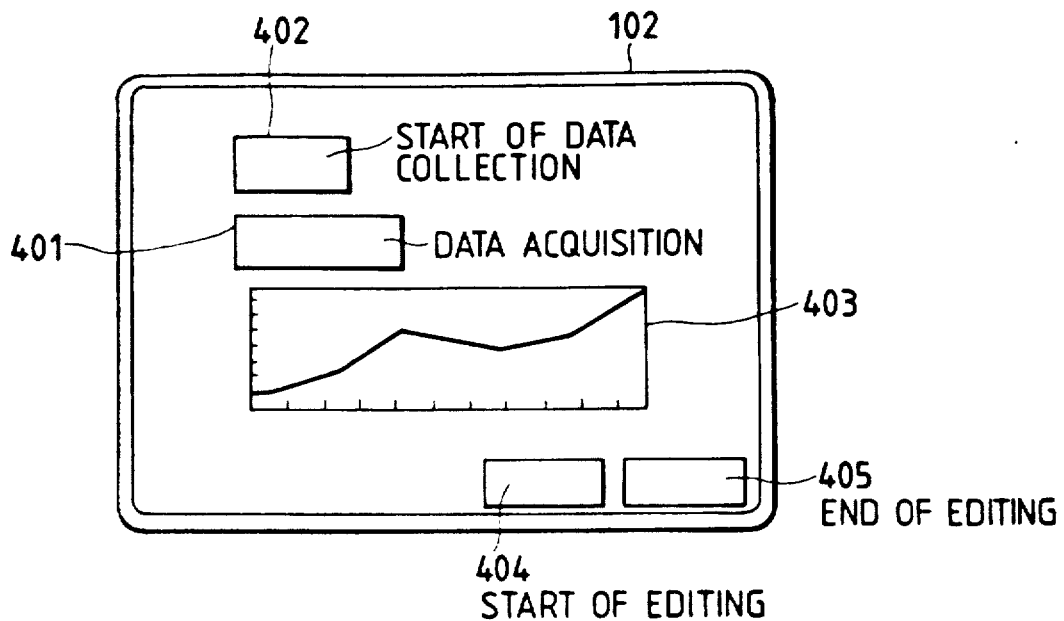
FIG. 4 shows a display created by the user interface system.

The purpose of the UI construction system is to realize easy definitions for the program function calls and UI editing depending on the operations carried out by the user using the physical input device, such as the mouse 103 or keyboard 104. FIG. 4 shows an example of a UI display for a data collection program organized by acquisition and collection functions by clicking the data acquisition icon (401) and data collection icon (402) respectively. The result after collecting data can be shown as a graph (403). Furthermore, by clicking the "start of editing" icon (404) or the "end of editing" icon (405), the starting or stopping of the editing function of the UI system can be initiated. When the UI is editing, by clicking the data acquisition icon or the data collection icon, the displayed positions of those icons may be moved depending on the cursor movement.

In the following, the data collection operation where the position of a data acquisition icon 401 located under the data collection start icon 402 is modified to be located at the right side of the start of data collection icon position, will be explained as an example.

First of all the initial state of the input device is shown in FIG. 6(a). When the "start of editing" icon is clicked, the switching function for the logical input device locks up the input device table and transmits the input data from the mouse 103 (input device) for logical input device execution to the UI execution function. The input data transmitted to the UI execution function from the switching function for the logical input device has the form shown in FIG. 7, and includes information concerning an input device name, an input operation name, cursor coordinates and a character code.

The term logical input device means refers to the input device name in the information which is provided by the switching device 106. The UI execution function identifies the user's operation for the start of editing icon from the cursor coordinates in the input data and the icon position in the UI execution data.

Then, the UI execution function executes the process specification part depending on the rule with the "start of editing" icon in the UI execution data. Of course, this assumes that the rule of the "start of editing" icon has already been defined.

The "assign" in the process operation causes the process to relate the logical input device to the physical input device; more precisely, to relate to the "mouse for editing" as a logical input device for the "mouse" as a physical input device. As a result of the execution of this assignment, the contents of the input device table are updated as shown in FIG. 6(b). Since the logical input device is simply a name, it can be freely created depending on the user's requirements.

Next, if the user pushes the mouse when the cursor is located on the data acquisition icon, then the switching function of the input device looks up the updated input device table and transmits its information to the UI execution function through the "mouse for editing" which acts as a logical input device. The execution device identifies the information as an icon operation for data acquisition, and executes the correct process, following the rule shown in FIG. 8 concerned with data acquisition.

In this case, since the input device name is "mouse for editing" the lower rule of (c) in FIG. 8 is fulfilled.

Figure 5:
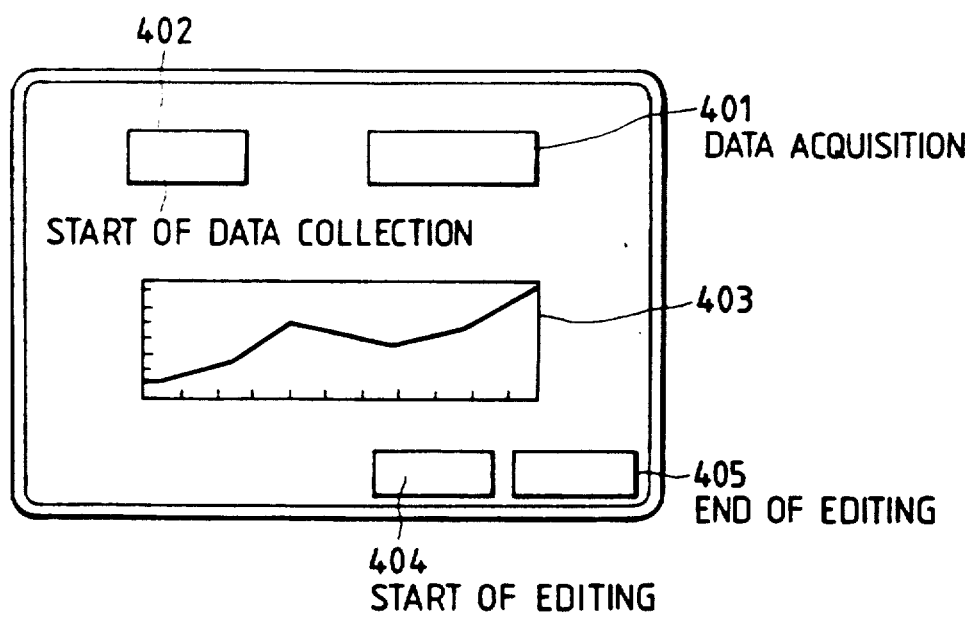
FIG. 5 shows an alternative display achieved by editing the display of FIG. 4.

Therefore, the UI execution function executes the process operation shown in FIG. 8 and the data acquisition icon can be moved by the mouse in the process specification part, depending on the cursor movement as long as the mouse button is being pushed down. The user can move the data acquisition icon with the mouse until the icon location is attained, as seen in FIG. 5.

If the user clicks the icon end of editing in this state, the UI execution function initiates the process operation shown at part (b) in FIG. 8 which is concerned with the "end of editing" icon. As a result, the contents of the input device table are again updated, as seen at FIG. 6(a), and the switching function of the logical input device then transmits the operation of the mouse by a user to the UI execution function as an input from the mouse for execution.

Next, by clicking the data acquisition icon, the process depending on the rule shown at (c) in FIG. 8 defined for the data acquisition icon is executed and the upper part of the rule shown at (c) in FIG. 8 concerned with the process for the mouse is executed.

Thus, the operation of data acquisition is communicated to the data collection program.

Here, the user's operation to push the mouse on the acquisition icon is used for two purposes: one is to move the data acquisition icon; the other is to specify the data acquisition of the data collection program depending on the condition of the system.

In the process definition of data acquisition to specify correct operation as shown at part (c) of FIG. 8, each process is defined individually by independent rules. Therefore, when the definition of one process is modified, the definitions of the other processes are not influenced. Furthermore, the addition and modification of a process can be easily performed with minimal errors even in the cases of multiple users and different items.

Although in this example both the mouse for execution and for editing are used as logical input devices corresponding to the physical input device, various options can be added for the logical input devices by changing the icon color or icon size depending on the purpose.

Even in this case, processes for different purposes can be defined based on an independent rule for individual logical input devices and do not involve complicated rules, although the number of purposes is increased. Therefore, using this invention, addition to a modification of the process (program) can be easily carried out, whereas a conventional UI construction system gets more complicated with an increase in the number of purposes corresponding to the process rules covered by the same operation.

By installing logical input devices depending on the user's requirements and switching the relationship between the physical input device and the logical input devices, correct use of input data from the same physical input data for different purposes can be easily specified, using this invention.

Also, by changing the relationship between the physical input device and the logical input device by the results of input data processing, the input data from the physical input data can be properly used for multiple purposes.

In addition, since input data is acquired depending on different situations by the same users, their rules for the user's operation can be divided depending on the purpose and they can be easily modified or added to. Furthermore, the complexity of the process rules can be avoided. Therefore, the definition of the rule by multiple users at different times can be performed efficiently.

Furthermore, by using this invention for a UI construction system, the user can easily specify correct use of operations for different purposes, and simply define the process for the function calls of the specified device of a program, and for the UI construction or editing with a unified method.

For this reason, the user can define and modify the UI construction and editing which was not possible by the conventional method.

What is claimed is:

1. A user interface system, comprising:
    means for receiving a data input from a user via a data input device;
    reference memory means for defining a plurality of logical device names associated with said data input device, including means for selecting one of said logical device names and for associating said selected one of said logical device names with said data input to form a data signal comprising said data input and said associated logical device name;
    rule base memory means for storing a plurality of operations including operations corresponding to said plurality of logical device names; and
    processing means responsive to said data signal for retrieving from said rule base memory means the operation corresponding to said associated logical device name in said data signal, and for generating a control output on the basis of said data input and said operation corresponding to said associated logical device name;
    wherein at least one of said operations stored in said rule base memory means is a selection operation arranged to determine the selection of said selected one of said logical device names by said selecting means in said reference memory means, and said processing means includes means responsive to said selection operation for controlling said selection means to change the selected one of said logical device names to be associated with a data input from said data input device.

2. A user interface system according to claim 1, wherein said processing means determines the operations corresponding to said associated logical device name on the basis of said data input.

3. A user interface system according to claim 1, wherein there is a one-to-one relationship between said plurality of operations and said plurality of logical device names stored in said rule base memory means.

4. A user interface system, comprising:
    a data input device;
    means for receiving a data input from said data input device;
    reference memory means for defining a plurality of logical device names associated with said data input device, including means for selecting one of said logical device names, and associating the selected one of said logical device names with said data input to form a data signal comprising said data input and said associated logical device name;
    processing means responsive to said data signal for executing an operation corresponding to said associated logical device name in said data signal and for generating a control output on the basis of said data input and said operation corresponding to said associated logical device name; and
    a display device for displaying a display corresponding to said control output;
    wherein at least one of said operations executed by said processing means in response to an input from a user is a selection operation arranged to determine the selection of said selected one of said logical device names by said selection means in said reference memory means, and said processing means includes means responsive to said selection operation for controlling said selection means to change the selected one of said logical device names to be associated with a data input from said data input device.

5. A user interface system, comprising:

library memory means for storing a plurality of object data, each of said object data corresponding to a display object;

means for associating with said object data a plurality of user parameters, each said object data and at least some of said plurality of user parameters together forming a user object; and processing means responsive to data input by a user via an input device for processing each user object to generate a plurality of display objects;

wherein each of said object data includes a plurality of logical device names associated with said input device, said user data includes a corresponding plurality of operations associated with said plurality of logical device names, said processing means including means for selecting one of said logical device names and for generating one of said display objects on the basis of the operation corresponding to the selected logical device name, and at least one of said user objects includes user parameters corresponding to selection of said one of said logical device names by said processing means.

6. A user interface method to be performed by a user interface system, comprising the steps of:

receiving a data input from a data input device;

defining a plurality of logical device names associated with said data input device;

selecting one of said logical device names;

associating said selected one of said logical device names with said data input to form a data signal, said data signal comprising said data input and said selected logical device name;

storing respective operations corresponding to said plurality of logical device names;

determining the operation corresponding to said logical device name of said data signal;

generating a control output on the basis of said operation corresponding to said selected logical device name; and executing one of said operations in response to a user input to change the selection of said selected one of said logical device names.

7. A user interface system for switching a relationship between an input data device and an operation to be performed in response to the data input device, comprising:

reference memory means for defining a plurality of names associated with said data input device;

switching means responsive to a data input from said data input device for input device for selecting one of said names stored in said reference memory means for associating said selected one of names with said data input to form a data signal comprising said data input and said associated name, and for outputting said data signal; and rule base memory means for storing a plurality of operations including operations corresponding to said plurality of names;

wherein at least one of said operations stored in said rule base memory means is a name selection operation to determine the selection one of said names by said switching means, said processing means outputting said control output to said switching means when said name selection operation is executed to control selection of a name by switching means.

8. A user interface system for switching a relationship between an input data device and an operation to be performed in response to the data input device, comprising:

a data input device;

reference memory means for defining a plurality of names associated with said data input device;

switching means responsive to a data input from said data input device for input device for selecting one of said names stored in said reference memory means, for associating said selected one of names with said data input to form a data signal comrprising said data input and said associated name, and for outputting said data signal;

rule base memory means for storing a plurality of operations including respective operations corresponding to said plurality of names;

processing means connected to receive said data signal for retrieving the operation corresponding to said associated name in said data signal from said rule base memory means, and for outputting a control output on the basis of said data input and said operation corresponding to said associated name; and a display device connected to said processing means for displaying a display corresponding to said control output;

wherein at least one of said one of said operations stored in said rule base memory means is a name selection operation to determine the selection one of said names by said switching means, said processing means outputting said control output to said switching means when said name selection operation is executed to control selection of a name by switching means.

* * * * *